May 1, 1962  B. D. KENNEY ET AL  3,032,127
CORE ORIENTATION DEVICE
Filed Nov. 13, 1957  2 Sheets-Sheet 1
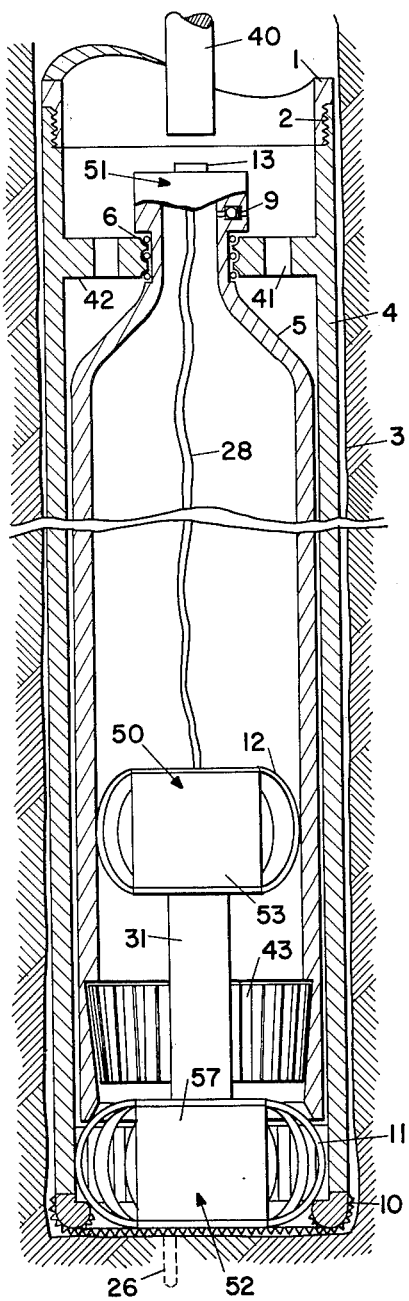
FIG.-1
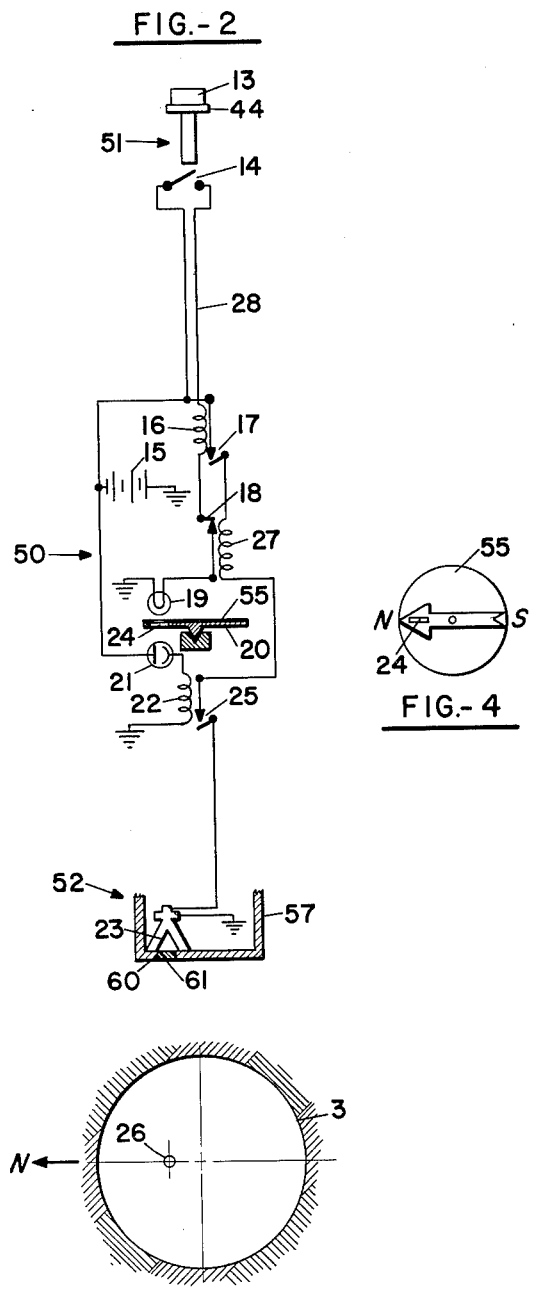
FIG.-2
FIG.-4
FIG.-3
Alexander B. Hildebrandt
Ben D. Kenney   Inventors
By James A. Reilly  Attorney May 1, 1962 B. D. KENNEY ET AL 3,032,127
CORE ORIENTATION DEVICE
Filed Nov. 13, 1957 2 Sheets-Sheet 2

Alexander B. Hildebrandt
Ben D. Kenney                Inventors

By *James A. Reilly* Attorney

United States Patent Office 3,032,127
Patented May 1, 1962

3,032,127
CORE ORIENTATION DEVICE
Ben D. Kenney, Tucson, Ariz., and Alexander B. Hildebrandt, Tulsa, Okla., assignors, by mesne assignments, to Jersey Production Research Company
Filed Nov. 13, 1957, Ser. No. 696,185
4 Claims. (Cl. 175—44)

This invention pertains generally to the coring of subterranean formations and more particularly to a system for orienting core samples taken from subsurface strata during the course of drilling boreholes in the earth—e.g., in drilling oil wells. In accordance with the present invention, a perforator is used for automatically marking a formation so that the mark on a core taken from the formation is in a predetermined position, preferably directly north of center.

This application is a continuation-in-part application based on Serial No. 379,754 filed in the names of Ben D. Kenney and Alexander B. Hildebrandt on August 7, 1953, now abandoned.

In a well drilling operation, it is customary to obtain cores periodically which are cylindrical sections cut by the drill from subsurface strata penetrated by the well. Orienting of these cores consists of orienting them in space in the same positions in which they occur in the formations from whence they are obtained. Normally, the orientation of core samples is done for the purpose of aiding in properly evaluating subsurface formations and thus determining the proper drilling program for future wells. A properly oriented core may be used, for example, in determining the dip and strike of subsurface formations, such data being of considerable importance for properly determining the magnitude of dip and the direction of the dip of the subsurface strata. This dip and strike information can be easily obtained from oriented cores that contain bedding planes.

Although data for determining dip and strike can be obtained by other methods, viz electrical log and borehole profile logging techniques, such methods rely on the difference in properties between successive strata and are not applicable where massive bodies of limestone or sandstones are encountered. As an example, in order to determine dip and strike from electrical logs, two or more wells must be logged; and interface of the same formation found in each well is correlated as to depth in order to determine the dipping features of the formation. These dipping features, however, are highly useful in ascertaining if the well is being drilled on geological structure where oil or gas is usually located. Hence, the need for oriented cores to obtain the fullest information related to dip and strike in the drilling of only one well in massive bodies of limestone or sandstone that are encountered is readily apparent.

In some instances, it is possible to orient a core by an inherent natural magnetism which may have been established in it by the oriented effect of the earth's magnetic field acting upon magnetizable particels present within the formation over long geological periods of time. However, such methods of orienting cores are not often feasible and, when feasible, are not always reliable. In such methods, a core which has been removed from a borehole must be oriented with sensitive instruments to determine the magnetic polar properties of small magnetizable core particles. Such measurements are quit prone to error, due to the small magnitude of the magnetic forces involved. Thus, it is usually preferred, albeit necessary, to orient a core by some method of marking during or prior to the taking of the core.

It is accordingly an object of the present invention to provide an apparatus whereby a core sample is oriented in-situ and the information is obtained permanently while the core is still in place in the formation.

It is a further object of the invention to provide an apparatus whereby an inscription or identifying mark is placed on the core immediately prior to its being cut and for orienting this mark with respect to a predetermined direction.

A still further object of the invention is to provide a core-orienting apparatus which will insure that a drilled core will be in position with respect to the substrata at the time the marking apparatus is caused to operate.

These and related objects are realized in accordance with an apparatus embodiment of the present invention by using a rotary-type coring apparatus which has associated with it a device for marking a core in-situ. This marking device is adapted to form a perforation or hole in the core. The apparatus further includes means for firing a perforating shot into the core in a pre-determined position, preferably directly north of center of the core.

The invention may be better understood by reference to the attached figures which schematically depict a preferred apparatus embodiment of the invention contemplated to illustrate the best mode of carrying out the invention.

FIGURE 1 illustrates the apparatus in vertical cross section;

FIGURE 2 diagrammatically illustrates electrical components and mechanism that may be used as a marking means;

FIGURE 3 is a view of the bottom of a borehole showing the position of a perforation just north of center as made by this invention.

FIGURE 4 is a top view of a compas unit that may be used in the illustrated apparatus;

Figure 5:
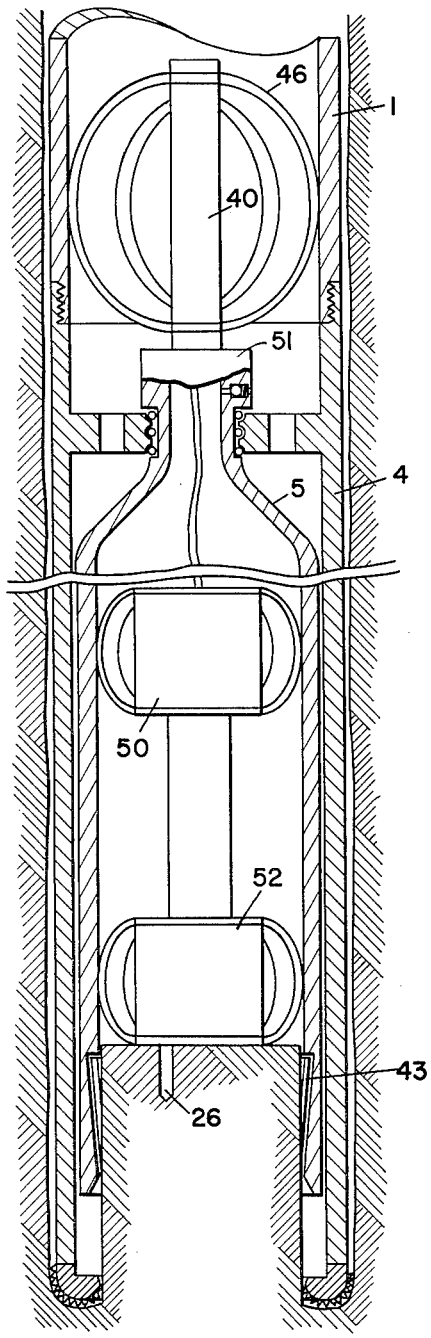
FIGURE 5 illustrates in vertical cross section the position of the apparatus after a core has been marked and a core-cutting operation has been initiated.

Referring to the drawings—and especially to FIGURE 1—the apparatus of the invention is shown within a borehole 3 in the condition in which it would be immediately prior to a coring operation. The major components of the apparatus shown there include drill pipe 1, a core barrel comprising an outer barrel 4 and an inner barrel 5, coring bit 10, firing control mechanism 50, starting switch mechanism 51, perforating mechanism 52, and centering springs 11 and 12.

Referring first to the core barrel, this structure is made of non-magnetic material such as Monel metal or stainless steel; and it will be observed that the outer barrel 4 of the core barrel is threadedly connected at pipe joint 2 to the lower end of the drill string 1. Coring bit 10 is threadedly connected to the lower end of the outer barrel, and the inner barrel 5 is supported from and within the outer barrel by means of the swivel section 6. As in conventional core barrels, the swivel section enables the inner barrel 5 to remain stationary during a coring operation, while the outer barrel 4 rotates with the drill string 1 and the bit 10. Fluid passageways 41 are provided in the web 42, which actually supports the swivel section, to enable drilling fluid to flow from the drill pipe to the annular space between the two barrels. A core catcher 43 mounted near the lower end and within the inner barrel 5 is provided as in conventional barrels to retain a core within the inner barrel following a coring operation. Also included in the core barrel is relief valve 9 which allows the escape of drilling fluid from the inner barrel 5 as a core enters this barrel.

Figure 6:
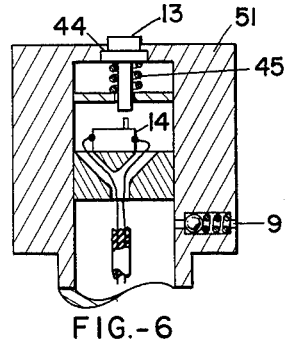
FIGURE 6 illustrates the mechanical embodiments of the starting switch mechanism.

Referring next specifically to the starting switch mechanism 51, attention is directed to FIGURES 1, 2, and 6 which illustrate this portion of the over-all assembly. Structural aspects of the mechanism 51 are emphasized in FIGURE 6, whereas its electrical features are emphasized in FIGURE 2.

Starting switch mechanism 51 consists essentially of a plunger-operated, normally open switch. Thus, plunger 13 is mounted within the upper end of the inner barrel 5 and protrudes a short distance above the barrel. As shown in FIGURE 6, it is preferably provided with a shoulder 44 or equivalent means for retaining it within the inner barrel; and it is further provided with a spring 45 or equivalent means for normally holding it away from the switch 14. Closure of switch 14 is realized simply by dropping a go-devil 40 down the drill pipe 1 and directing the weight of the go-devil against the plunger 13. The go-devil—shown better in FIGURE 5—is preferably provided with centering springs 46 in order that the lower end of this device is sure to engage the plunger 13.

As indicated in FIGURE 1, perforating mechanism 52 may be conveniently enclosed within an enclosure 57 to protect it from the effects of drilling fluid and the like. A set of centering springs 11 is attached to the outer periphery of the enclosure and frictionally engages inner barrel 5 with bit 10 by bearing against the inner surface of the core bit 10. These centering springs resist or prevent relative rotational movement between the outer barrel 4 and the perforating mechanism prior to coring for reasons that will become clear later in this description.

Referring next to firing control mechanism 50, it will be observed in FIGURE 1 that this mechanism is spaced above and rigidly interconnected with the perforating mechanism 52 by means of a connecting member 31. Conveniently, the connecting member 31 is a conduit or other tubular member, made of non-magnetic material and adapted to provide the necessary support and to serve as a housing for electrical leads connecting the firing control mechanism with perforating mechanism.

As in the case of the perforating mechanism 52, the firing control mechanism 50 is preferably enclosed within a suitable container 53 made of non-magnetic material to which are attached a set of centering springs 12. The centering springs 12 thrust against the inner wall surface of the inner barrel 5 and serve to prevent relative rotational movement between the inner barrel and the firing control mechanism. Again, the primary purpose for the centering springs will be made clearer later in this description.

Having thus presented the general structural nature and relationship of the starting switch mechanism 51, the firing control mechanism 50, and the perforating mechanism 52, attention is next directed to FIGURE 2 in which is presented a schematic sketch of the electrical components of these mechanisms. In this figure, the major components include jet perforator 23, normally open relays 17 and 25, normally closed relay 18, compass 20, a thin disc-like, non-magnetic and opaque compass card 55 having a hole 24, light 19, photosensitive cell 21, battery 15, insulated wire 28 connecting normally open switch 14 with the firing mechanism 50, and plunger 13. The circuitry, it will be noted, is shown as it would be immediately prior to a coring operation.

Expressed very briefly, the firing control mechanism 50 is of a character to trigger the perforating mechanism 52 whenever the starting switch mechanism 51 has been first actuated, and when the jet perforator is due north of the longitudinal center line of the core barrel. Thus, the azimuthal relation of the light 19, photosensitive cell 21, and the shaped charge 23 are known and fixed (preferably in longitudinal alignment relative to the longitudinal axis of the core barrel) when the barrel is assembled for use. Actual mounting and alignment of these various elements may be obtained according to conventional means. For example, a suitable structure for readily achieving satisfactory mounting and alignment is shown in FIGURE 7.

Compass 20 is interposed between the light 19 and the photosensitive cell 21, and it is provided with a compass card 55 which rotates with the compass needle. As mentioned earlier, the card is constructed of a non-magnetic material (for example, pressed paper) which is opaque to light. A top view of the compass 20 is shown in FIGURE 4. Hole or slot 24 is provided along the periphery of the card and is arranged so as to be in alignment with the light 19 and photocell 21 whenever the compass needle is pointing toward due north. The jet perforator will also be due north of the axis of the core barrel at this time.

For the sake of convenience in the present description, it will be assumed that the hole in the compass card coincides with the north end of the compass needle and that the light 19, the photosensitive cell 21, and the shaped charge 23 are in longitudinal alignment with one another. It will be recognized, of course, that for the purposes of the invention it is only necessary that the light 19 and the photosensitive cell be in alignment with one another and that the azimuthal relations between these two members and the perforating mechanism and between the hole and north on the compass card be accurately known beforehand. Conveniently, as mentioned above, it is preferable to have all of these members in a due north alignment so as to simplify interpretation of the information obtained by the device.

Figure 7:
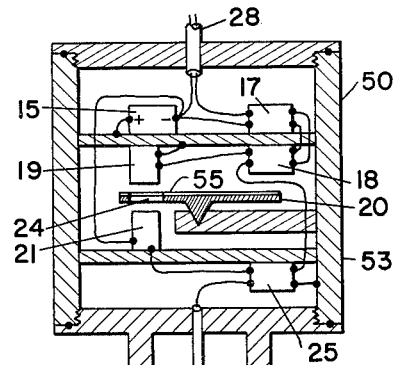
FIGURE 7 illustrates the mechanical components of the firing control mechanism.
Figure 8:
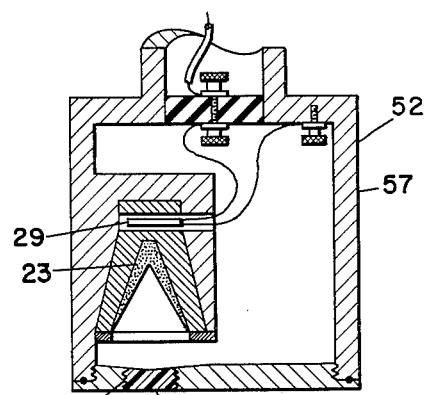
FIGURE 8 illustrates a preferred perforating mechanism.

As shown in FIGURE 7, the various relays, the light 19, the photocell 21, and the compass of the fire control mechanism are conveniently supported directly or indirectly from the housing or container 53. Also as mentioned earlier, relays 17 and 25 are normally open, and relay 18 is normally closed. Power source 15 is connected through relay 14 to the relay 17 so that closure of the starting switch 14 energizes the coil 16 of relay 17 and thereby closes the switch of this relay. Since the switch of relay 18 is connected in series with the coil 16 of relay 17, it follows that light 19 is energized when switch 14 is closed. Furthermore, since a potential is continuously impressed upon photosensitive cell 21 by virtue of a direct connection with the power source 15, it similarly follows that the photosensitive cell generates an electrical signal whenever the hole 24 in the compass card 55 is aligned with the photosensitive cell and the energized light 19. When the photocell 21 is thus activated, the resulting signal flows through coil 22 and thereby closes the switch of relay 25. The switch of the latter relay—i.e., switch 25—is connected in series with coil 27 of relay 18 and with the switch of relay 17 and also with the shaped charge 23. Accordingly, closure of switch 25 causes current to flow from power source 15 through relay 17 and thence through the coil 27 and the switch 25 to the detonating cap of the shaped charge, causing the charge to discharge explosively through an opening 60 to form a perforation 26 in the formation underlying the perforating mechanism. At this point, it will be noted that the opening 60 is normally closed as shown in FIGURE 8 with a frangible member 61 such as Bakelite or the like for preventing dirt and fluids from entering or contacting the shaped charge. The frangible member 61 is disintegrated upon detonation of the perforating charge.

For a more detailed understanding of how the shaped charge 23 may be mounted within the tubular container 57, attention is directed to FIGURE 8. This figure shows how a conventional shaped charge may be supported from the container 57 and how the firing cap 29 for the shaped charge may be connected electrically to the fire control mechanism above.

Having thus briefly described and outlined the structural components of the embodiment of the invention illustrated in the attached drawing, attention is now directed toward a consideration of the manner in which the apparatus may be operated. First, the fire control mechanism and the perforating mechanism are inserted within the core barrel; and the entire core barrel and core marking assembly is attached to the lower end of drill pipe 1. The assembly is then lowered to the bottom of a borehole 3. When the core bit 10 has reached the bottom of the hole, a go-devil 40 is lowered or dropped within the well pipe and depresses the plunger 13. The go-devil 40 is provided with centering springs 46 to assure its contact with plunger 13. Depression of the plunger causes the switch 14 to close, and the switch in turn causes relay 17 to close and also causes the light source 19 to be energized. The firing control mechanism, as explained earlier, is now conditioned to detonate the shaped charge 23 whenever the needle of the compass 20, lamp 19, and photosensitive cell 21 are in alignment and the compass needle is pointed directly north. Since this orientation of these components will rarely if ever exist at this stage, the next step in marking a core consists in slowly rotating the tool one complete revolution from the surface of the earth. When the tool has been rotated sufficiently to bring the light source and the photosensitive cell in direct alignment with the hole 24 in the compass card, the photosensitive cell 21 will be energized. Energizing of the cell 21 causes current to flow through relay coil 22, thereby closing relay 25. The current flowing due to closure of relay 25 detonates cap 29 which in turn fires the shaped charge 23.

Since the centering springs 11 (see FIGURE 1) prevent rotational movement between perforating mechanism 52 and the outer barrel 4, it will be recognized that the perforating mechanism and the fire control mechanism 50 must rotate in unison with the outer barrel before a core enters the barrel. Furthermore, since the centering springs 12 on the fire control mechanism prevent relative rotation between this mechanism and the inner barrel 5, the inner barrel also rotates in unison with the outer barrel at this stage. As explained earlier in this description, when the perforating mechanism and the firing control mechanism have been rotated to the point where the hole 24 and the light 19 and the photocell 21 are in alignment, the shaped charge 23 is fired. Firing of the charge forms a perforation 26, its relative location being shown in FIGURE 3, which is a view of the borehole bottom. The location of this perforation is preferably preselected to be due north of the center line of the longitudinal axis of the coring tool. Since the firing circuit of the shaped charge is in series with the coil 27 of the relay 18, it will be recognized that the switch of this relay will open when the shaped charge is fired. The opening of the relay 18 plays no vital role in marking a core, but it does preserve the life of the battery or other power source 15. It will be appreciated that this relay must be provided with a sufficient delay to assure firing of the shaped charge 23 before the relay opens. Relays of this character are well known in the art.

Since one complete revolution or rotation of the core barrel is sufficient to fire the charge 23, the coring operation may proceed as soon as this single rotation has been completed. This phase of the over-all operation may be carried out in a conventional manner, as by imposing a load upon the bit 10 and rotating the drill string 1. As soon as a core begins to enter through the bit 10 into the core-receiving barrel 5, the perforating mechanism is forced upwardly by the entering core as shown in FIGURE 5. As soon as the centering springs 11 have entered within the inner barrel 5, it will be recognized that the inner barrel remains stationary during rotation of the outer barrel. In other words, conventional core barrel operation follows as soon as the centering springs 11 have lost contact with the outer barrel.

The coring operation is continued until a predetermined amount of core has been obtained. At this point, the core is parted from the formation in a conventional manner; and the entire apparatus is raised to the surface of the earth. The core catcher 43 prevents the core from dropping out of the inner barrel.

While the foregoing description has been directed toward an embodiment of the invention which is considered to constitute the best mode of carrying out the invention, it will be recognized that numerous modifications, additions, and subtractions may be made to the illustrated embodiment without departing from the spirit or scope of this invention. Thus, it will be apparent that a perforating bullet may be readily substituted for the shaped charge considered in the above description.

The invention claimed is:

1. An apparatus for orienting a core cut from a formation within a borehole which comprises a supporting body adapted to be placed within the borehole with its longitudinal axis in substantial alignment with the axis of the borehole and further adapted to be rotated about said longitudinal axis, downwardly directed and electrically actuable perforating means held by said body at the lower end thereof and eccentric of said longitudinal axis, an electrical circuit adapted when complete to actuate said perforating means, a source of energy for said circuit, a first normally open switch in said circuit, a compass including a compass needle supported by said body, a compass card supported by said compass and rotatable with the needle thereof, said compass card having a radially extending slot, a light source positioned on one side of said compass card and a photosensitive cell positioned on the opposite side of said card adjacent said light source, said light source and said cell being supported by said body on a common azimuth with said perforating means, and a second normally open switch in said circuit adapted to close in response to a signal from said photosensitive cell, whereby when said first switch is closed and said supporting body is rotated in the borehole, said light source and said photosensitive cell are brought into alignment with said opening thereby actuating said perforating means when said perforating means has attained the same azimuth as said opening.

2. An apparatus for orienting a core to be cut from a formation within a borehole which comprises an elongated supporting body adapted to be placed within the borehole with its longitudinal axis in substantial axial alignment therewith, downwardly directed and electrically actuable perforating means held by said body at the lower end thereof and eccentric of said body, an electrical circuit adapted to actuate said perforating means when completed, a source of energy for said circuit, a first normally open switch in said circuit, a compass element including a needle supported by said body, a compass card rotatable with the needle of said compass, said card having a radial slot, a light source positioned on one side of said compass card and a photosensitive cell positioned on the opposite side of said card adjacent said light source, said light source and said cell being supported by said body on the same azimuth relative to the longitudinal axis thereof and in a preselected azimuthal relation with said perforating means, and a normally open second switch in said electrical circuit adapted to close in response to a signal from said photosensitive cell, whereby when said first switch is closed and said supporting body is rotated about its longitudinal axis within the borehole, said light source and said photosensitive cell are brought into alignment with said radial slot, thereby actuating said perforating means when said perforating means has attained said preselected azimuthal relation with said light source and said photosensitive cell.

3. An apparatus for orienting a core to be cut from a formation underlying a borehole which comprises an elongated supporting body rotatable about its axis and adapted to be lowered within the borehole in axial alignment therewith, a downwardly directed shaped explosive charge supported at the lower end of said body and eccentrically thereof, compass means supported by said body, a compass card rotatably supported by said compass means, said card having a radial slot therein, a light source on one side of said card, a photoelectric cell on the opposite side of said card, said source and said cell being supported by said body so as to be aligned with said slot upon rotation of said body and thereby transmit light from the source through the slot to the cell, said source and said cell having a preselected azimuthal relation with said shaped charge, electrical circuit means operable to energize said source, and means responsive to energization of said photoelectric cell to fire said explosive charge.

4. An apparatus for marking the bottom of a borehole which comprises in combination downwardly directed, electrically operable perforating means, supporting means to support said perforating means adjacent the borehole bottom and eccentric to the axis of the borehole, said supporting means being rotatable about the longitudinal axis of the borehole, a compass having an opaque compass card supported by said supporting means above said perforating means, said compass card having a radially extending slot for the passage of light therethrough, a light source and a photoelectric cell supported by said supporting means on opposite sides of said compass card and adjacent one another, said light source and said photosensitive cell having a preselected azimuth relative to said perforating means and being positioned so as to become aligned with said opening upon rotation of said supporting means, an electrical power source, an electrical circuit connecting said power source with said perforating means, a first normally open switch in said electrical circuit operable to energize said light source, and a second normally open switch in said circuit operable in response to a signal from said photosensitive cell to complete said circuit.

References Cited in the file of this patent
UNITED STATES PATENTS

| | | |
|---|---|---|
| 1,924,071 | Laudermilk | Aug. 22, 1933 |
| 2,003,345 | De Maris | June 4, 1935 |
| 2,197,062 | Sweet et al. | Apr. 16, 1940 |
| 2,208,147 | Eisler | July 16, 1940 |
| 2,317,632 | Miller | Apr. 27, 1943 |
| 2,365,999 | Boucher | Dec. 26, 1944 |
| 2,438,293 | Livingston | Mar. 23, 1948 |
| 2,567,507 | Brown | Sept. 11, 1951 |
| 2,676,787 | Johnson | Apr. 27, 1954 |
| 2,797,892 | Ryan | July 2, 1957 |

OTHER REFERENCES

Doll: Abstract of app. S.N. 78,333, published Jan. 13, 1953; 666 O.G., 599–600.